United States Patent [19]

Hojo et al.

[11] Patent Number: 4,738,650
[45] Date of Patent: Apr. 19, 1988

[54] FLEXIBLE SHAFT COUPLING, PARTICULARLY FOR MOTOR VEHICLE DRIVE SHAFTS

[75] Inventors: Yasuo Hojo, Nagoya; Yoshihiro Nunotaki, Okazaki; Hiroshi Harada, Tsu; Kenji Murase, Suzuka; Michihiro Kawada; Masahiro Ishigaki, both of Tsu, all of Japan

[73] Assignees: Ltd. Toyo Tire & Rubber Co., Osaka; Toyota Jidosya Kabushiki Kaisha, Aichi, both of Japan

[21] Appl. No.: 821,083

[22] Filed: Jan. 21, 1986

[30] Foreign Application Priority Data

Jan. 22, 1985 [JP] Japan .................... 60-7586[U]

[51] Int. Cl.$^4$ .................................................. F16D 3/78
[52] U.S. Cl. .......................................... 464/69; 464/71; 464/93
[58] Field of Search ............. 464/69, 71, 85, 87, 464/89, 90, 92, 93, 138

[56] References Cited

U.S. PATENT DOCUMENTS

| | | | |
|---|---|---|---|
| 1,793,347 | 2/1931 | Weir et al. | 464/71 |
| 3,113,625 | 12/1963 | Conover | 464/89 X |
| 3,560,034 | 2/1971 | Hipsher et al. | 464/89 X |
| 4,118,952 | 10/1978 | Kobayashi | 464/69 |
| 4,188,802 | 2/1980 | Zeidler et al. | 464/71 |
| 4,452,591 | 6/1984 | Fishbaugh et al. | 464/89 |
| 4,626,112 | 12/1986 | Kramer | 464/89 X |

FOREIGN PATENT DOCUMENTS

| | | | |
|---|---|---|---|
| 2752445 | 5/1979 | Fed. Rep. of Germany | 464/71 |
| 52-140758 | 11/1977 | Japan | |
| 59-122433 | 8/1984 | Japan | |
| 186635 | 12/1963 | Sweden | 464/89 |
| 720227 | 3/1980 | U.S.S.R. | 464/73 |

Primary Examiner—Daniel P. Stodola
Attorney, Agent, or Firm—Flynn, Thiel, Boutell & Tanis

[57] ABSTRACT

A flexible shaft coupling comprising drive side connecting elements and driven side connecting elements arranged alternately and equidistantly in an annular orientation, and coupling pieces of annular form linking mutually adjacent pairs of drive side connecting elements and driven side connecting elements, each of both connecting elements being formed of an inner sleeve, an outer sleeve and an elastic intermediate member bonding them, the coupling pieces being formed of a belt strip wrapping around the outer sleeve and an elastomeric body surrounding and covering the wrapped belt strip. The elastic intermediate member is formed as a rubber bushing press-fitted between the inner and outer sleeves and extends only in an axially middle portion of both sleeves, and adjacent to the rubber bushing, intermediate sleeves are fitted to the inner sleeve or outer sleeve. The elastic intermediate member has a compressive strain of 25–40%. Upon normal loading, the elastic intermediate member causes elastic deformation to conduct torque transmission and consequently, low torsional rigidity and low inclination rigidity are retained and run-out of drive shaft and driven shaft is minimized. Upon high loading, torque transmission is performed by the intermediate sleeve, inner sleeve and outer sleeve unitedly being in contact with one another with no vibrations and no noises.

4 Claims, 3 Drawing Sheets

FLEXIBLE SHAFT COUPLING, PARTICULARLY FOR MOTOR VEHICLE DRIVE SHAFTS

BACKGROUND OF THE INVENTION

1. Field of the Invention

This invention relates to a flexible coupling for power transmission which is referred to as a low-rigidity coupling.

2. Relates Art Statement

In power driving devices like motorcar vehicles, flexible couplings having vibration-absorbing capacity are used, for example, in the in-between linking part between a propeller shaft and a driven device mainly in order that torsional vibrations may not be transmitted to the driven device in the course of power transmission.

Known flexible couplings of this kind are of a construction wherein drive side connecting elements and driven side connecting elements are arranged alternately in a circular manner and pairs of adjoining connecting elements are linked mutually by means of coupling pieces having elasticity. More specifically, the drive side connecting element and the driven side connecting element are, as shown in FIG. 6 and FIG. 7, constructed so that an inner sleeve 4' made of metal for receiving therein a bolt for fixing to a drive shaft or a driven shaft is fitted in an outer sleeve 5' made of metal wrapped therearound with a belt strip 7' as a core material for coupling pieces and both inner and outer sleeves 4', 5' are united together by an elastic intermediate member 6' such as rubber interposed between these sleeves 4', 5'.

One example of such construction is disclosed in Japanese Patent Application Publication (Unexamined) No. 52-140758 (1977).

Existing flexible couplings are classified into two groups, that is, the elastic intermediate member 6' either fills completely the space between the inner sleeve 4' and the outer sleeve 5' in one group or leaves a void space in the axial direction between the inner and outer sleeves 4', 5' in the other group. However, what is common to them is that the elastic intermediate member 6' is provided to be located in a position where the coupling is always subjected to compressive deformations in the course of power transmission, namely the position where it is pressed and pinched by the inner sleeve 4' and outer sleeve 5'. This is contemplated having recourse to the cushioning effect of the elastic intermediate member by avoiding direct contact between the inner and outer sleeves of metal, and there occurs no problem in torque transmission upon low loading and normal loading.

In torque transmission under high loading, however, the elastic intermediate member 6' interposed between the inner and outer sleeves 4', 5' carries directly the high loads, which elevates the surface pressure. As a consequence, its elasticity is degraded owing to repeated strong compressions and lifetime is shortened.

Further problem was that the rotational direction of the flexible coupling as illustrated in FIG. 6 is determined as shown in the arrow line depending upon the arrangement order of the drive side connecting elements and driven side connecting elements, and when this flexible coupling is driven in the reverse rotation in the power transmission system with use of it, spring characteristics in torsional direction are extremely different.

In the case of the flexible coupling having a partial void space in the axial direction, when the elastic intermediate member 6' is vulcanized and bonded to the inner and outer sleeves 4', 5' it is required to give drawing to the outer sleeve 5' for the purpose of enhancing durability of rubber material. However, its draw ratio is limited, at most, to the order of 13% owing to the failure limit of metal and consequently, enhancement of durability cannot be expected so much.

This invention has been accomplished to cope with these prior art problems and to improve them, and has for an object to provide a flexible coupling of a type having a low torsional rigidity and low inclination rigidity.

SUMMARY OF THE INVENTION

An object of this invention is to provide a flexible coupling having increased durability to high loads.

Another object of this invention is to provide a flexible coupling wherein rubber shearing stress upon normal rotation and that upon reverse rotation on the drive side are equalized and run-out of drive shaft and driven shaft is decreased to the utmost thereby to prevent shock sounds (crash sounds) and continuous noises (confined sounds) to the car vehicles or the like.

According to this invention, there is provided a flexible coupling wherein drive side connecting elements and driven side connecting elements, each formed of an outer sleeve, an inner sleeve and an elastic intermediate member interposed therebetween and bonding them, are arranged alternately and equidistantly in a circular orientation, and pairs of adjoining connecting elements are linked mutually by coupling pieces which are formed by wrapping around each pair of adjoining connecting elements with a belt strip and further surrounding and covering the wrapped belt strip by an elastomeric material such as rubber or plastics, which coupling is characterized in that the elastic intermediate member is formed of a rubber bush press-fitted between the outer and inner sleeves, the bush extending axially between opposed terminal length portions of both sleeves and an intermediate sleeve for determining the approaching distance between the inner and outer sleeves is fitted to the inner sleeve or the outer sleeve, extending adjacent to the elastic intermediate member.

In the flexible coupling of this invention thus constructed, when it is used in the linking part between drive shaft and driven shaft and the drive shaft is revolved, torque transmission is performed, in the normal loading range, by reason of an appropriate compressive strength of the elastic intermediate member while exhibiting low torsional rigidity and low inclination rigidity whereas torque is transmitted, in the high loading range, by means of the intermediate sleeve since the intermediate sleeve and the outer sleeve or inner sleeve come into contact with each other before the elastic intermediate member is subjected to such strong compressions as it comes to lose its elasticity.

As a consequence, the elastic intermediate member undergoes only slight elastic fatigue and less damage, and can retain securely low torsional rigidity and low inclination rigidity over a long period of time.

Preferably, the flexible coupling is formed so that the elastic intermediate member is subjected to compressions in a compressive strain of 25–40% under normal loading conditions and the intermediate sleeve is capable of functioning as a high-rigidity coupling, making in contact with the inner and outer sleeves under higher loading conditions.

BRIEF DESCRIPTION OF THE DRAWINGS

This invention will be hereinafter described in more detail with reference to the accompanying drawings.

DESCRIPTION OF PREFERRED EMBODIMENT

Figure 1:
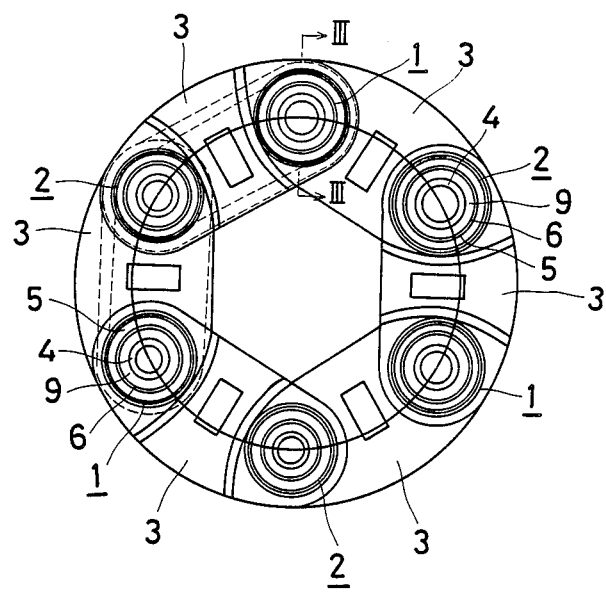
FIG. 1 is a diagrammatic plan view of one example of this invention.
Figure 2:
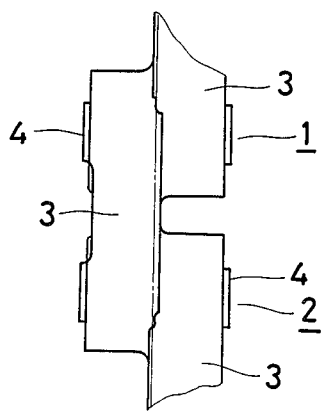
FIG. 2 is a side elevational view of the same example, with a portion omitted.

In a plan view of FIG. 1, there is shown a flexible shaft coupling viewed on the axial direction. In this flexible shaft coupling, a plurality of (for example, 3 pieces of) drive side connecting elements 1 (hereinafter referred to as "first connecting element") in which a bolt for fixing to the yoke (not shown) of drive shaft is received and a plurality of (the same number, for example 3 pieces of) driven side connecting elements 2 (hereinafter referred to as "second connecting element") in which a bolt for fixing to the yoke (not shown) of driven shaft is received are arranged alternately and equidistantly in an annular orientation, and 3 pairs of adjoining connecting elements 1, 2 are linked mutually by means of 6 pieces of coupling pieces 3 which are arranged, in the portions where the connecting elements are located, in a superposing manner, whereby an integral construction is formed which assumes a circular form as viewed on the axial direction and a castellated, toothed form (Cf. FIG. 2) as viewed on the axially normal direction.

Figure 5:
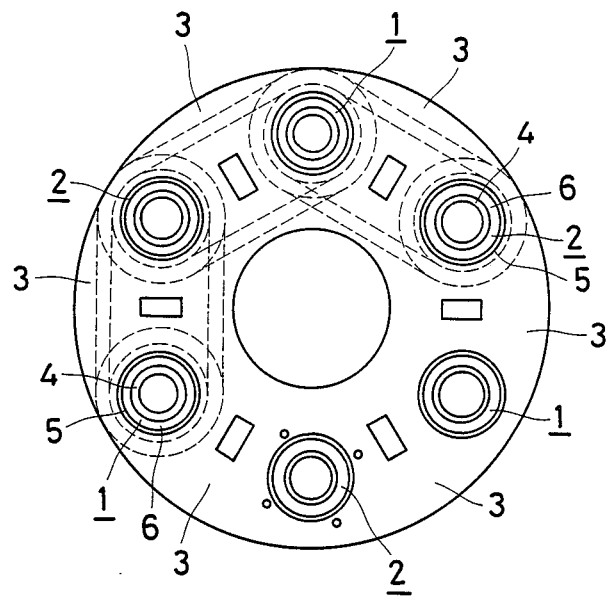
FIG. 5 is a plan view of a further example of this invention.
Figure 6:
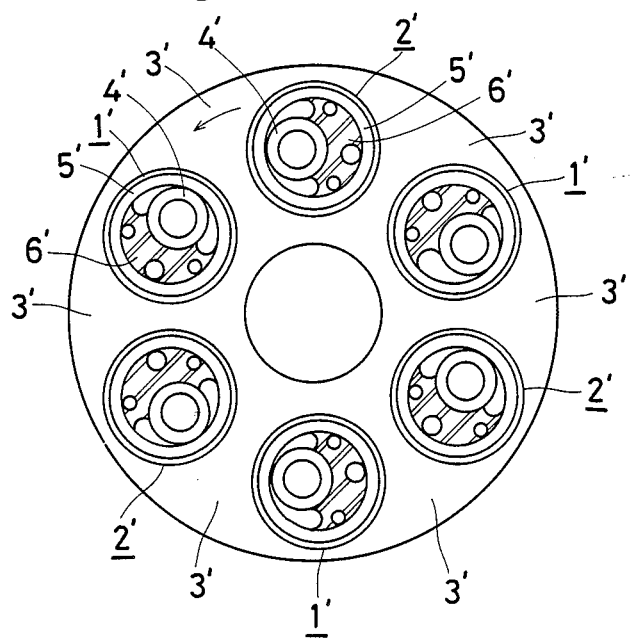
FIG. 6 and FIG. 7 are a plan view and a cross-sectional view of the essential part, respectively, of a prior art flexible coupling.
Figure 7:
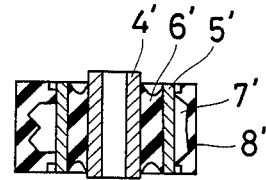

The coupling device may be otherwise formed by integral molding to coupling pieces 3 assuming a disk-form having no castellation (Cf. FIG. 5) or to coupling pieces 3 in another divided form.

Figure 3:
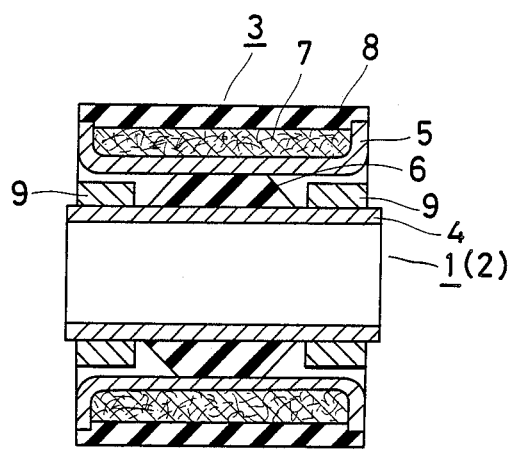
FIG. 3 is an enlarged sectional view taken on the III—III line in FIG. 1.

The first and second connecting elements 1, 2 each have concentrically an inner sleeve 4 and an outer sleeve 5, between which an elastic intermediate member 6 made of rubber is interposed and a pair of intermediate sleeves 9 are fitted on the inner sleeve 4 (FIG. 3), whereby both sleeves 4, 5 are rendered integral by the interposition of the elastic intermediate member 6.

The coupling piece 3 is formed so that multi-ply and multi-row of reinforcing cords such as polyester series are wrapped around adjoining outer sleeves 5, 5 to form an endless belt strip 7 having a moderate elasticity and the perimeter of the belt strip 7 is further surrounded and covered unitedly with an elastomeric material 8 such as rubber, synthetic plastics or the like to form a solid layer of required shape.

In this example, it is also possible to construct a flexible coupling by wrapping each belt strip 7 around the outer sleeves 5, 5 of each pair of the first and second connecting elements 1, 2 arranged in a definite place and then, cure-molding en bloc a rubber material to form coupling pieces linked together having a required shape.

In the flexible coupling thus constructed, the elastic intermediate member 6 is interposed between the inner sleeve 4 and the outer sleeve 5, extending axially not in the whole length of time, but in a central portion for instance, a half portion of the whole length except both terminal portions of them, in a compressed state. That is, a rubber bush as the elastic intermediate member 6 is first bonded to the inner sleeve 4 in its middle portion by vulcanization and then, the inner sleeve 4 is fitted into the outer sleeve 5 so that the rubber bush may be fitted between the inner and outer sleeves under compression, whereby the inner and outer sleeves can be rendered integral.

The elastic intermediate member 6 formed of a rubber bush is, for example, of a tubular or cyclindrically annular body assuming a trapezoidal form in cross-section in which the tube length is tapered down gradually from the inner radius side to the outer radius side and, when press-fitted within the outer sleeve 5, is adapted to receive compressions of about 22% in the thickness direction.

An intermediate sleeve 9 is fitted to the inner sleeve 4 in its terminal portions on both sides of the elastic intermediate member 6 and takes a cylinder form having an equal wall thickness. A clearance space is provided between the elastic intermediate member 6 and the intermediate sleeve 9 so as to not obstruct expansion of the elastic intermediate member.

The thickness is preferred to be such dimension that when the elastic intermediate member 6 undergoes compressions owing to the approach of the outer sleeve 5 to the inner sleeve 4 and the compression strain reaches in the order of 25–40%, the intermediate sleeve 9 is pinched tightly between the inner sleeve 4 and the outer sleeve 5.

The reason why the compression strain of the elastic intermediate member 6 is limited to 25–40% is because it is intended to equalize a lifetime of the belt strip 7 with a lifetime of the elastic intermediate member 6 thereby to eliminate the wastage and because if the compressive strain is in excess over the limit value, the lifetime of the elastic intermediate member 6 will be shortened.

The flexible coupling constructed as described above is, when used, linked to the yoke of a drive shaft with the aid of a bolt fitted in the inner sleeve 4 of the first connecting element 1 and linked to the yoke of a driven shaft with the aid of a bolt fitted in the inner sleeve 4 of the second connecting element 2.

The torque upon driving is, in the first connecting element 1, transmitted through the inner sleeve 4, elastic intermediate member 6 and outer sleeve 5 to the coupling piece 3 whereas, in the second connecting element 2, it is transmitted through the outer sleeve 5, elastic intermediate member 6 and inner sleeve 4 to the driven shaft. On that occasion, the first connecting element 1, relative to the rotational direction, causes the front side of the inner sleeve 4 to approach the inner face of the outer sleeve 5 and the second connecting element 2 causes the rear side to approach the inner face of the outer sleeve 5. As a consequence, the elastic intermediate member 6 interposed between the sleeves 4, 5 conducts the torque transmission while causing compression deformation.

In designing, by setting shape, dimension and elasticity of the elastic intermediate member 6 so that the member in the compressive deformation state has sufficient durability to this deformation under a loading condition until a normal load is reached, its elasticity can be retained over a long duration without giving rise to elasticity fatigue and torque transmission can be conducted without oscillation.

On the other hand, under a high loading condition, the inner sleeve 4 more approaches the outer sleeve 5 and eventually, rigid bodies of both sleeves 4, 5 come to contact with each other, pinching the intermediate sleeve 9 therebetween. As a result, torque is transmitted directly among the rigid bodies of the inner sleeve 4, intermediate sleeve 9 and outer sleeve 5. In this condition, the elastic intermediate member 6 is in the state of maximum compressive deformation having the allowance degree as determined at the time of designing and is stabilized without reaching strong compression, and hence, it is possible to avoid such conditions that exceed the elasticity limit.

Moreover, since the transmission of torque upon high loading is performed by the inner sleeve 4, intermediate sleeve 9 and outer sleeve 5 which are unitedly in contact with one another within the flexible coupling revolving in a definite direction, there are no inconveniences of repeated generation of collision sounds and shock sounds and generation of oscillation, and torque transmission under quietness is attained.

Figure 4:
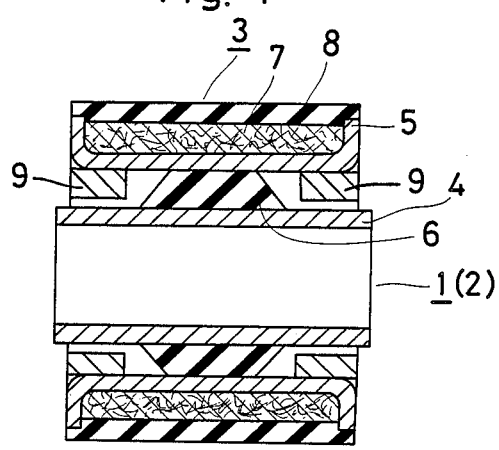
FIG. 4 is an enlarged sectional view of another example of this invention showing a drive side connecting element and a driven side connecting element.

Another example of this invention is illustrated in FIG. 4 and constructed similarly to the foregoing example except that the intermediate sleeve 9 is fitted to the outer sleeve 5. The effects of torque transmission are the same as those of the previous example.

Through both examples, the first and second connecting elements 1, 2 have the inner sleeve 4, outer sleeve 5, elastic intermediate member 6 and intermediate sleeve 9 arranged concentrically and assume the same profiles in every direction. Hence, characteristics of torque transmission never vary depending on rotational directions of the flexible coupling and no problem occurs upon normal rotation and reverse rotation.

According to this invention, as described above, it is possible to decrease run-out of the drive shaft and driven shaft to the utmost while retaining low torsional rigidity and low inclination rigidity, since torque transmission upon normal loading is performed by elastic deformation of the elastic intermediate member 6.

Further, in an allowance state before the elastic intermediate member 6 causes elasticity degradation owing to strong compressions, the intermediate sleeve 9 comes in contact with the inner sleeve 4 and the outer sleeve 5 whereas under conditions exceeding over the elasticity limit, the elastic intermediate member 6 is adapted not to undergo compressive deformation and torque transmission under high loads is performed. Consequently, it is possible to provide a flexible coupling which is not only durable against high loads, but retainable a long life by preventing degradation and failure of the elastic intermediate member 6.

Again, this invention allows it to maintain reversibility in transmission of rotations and to choose a suitable value of draw ratio with the elastic intermediate member 6, whereby durability is enhanced.

Notably, this invention can exhibit excellent effects, in an automatic speed change gear type of vehicles (AT motorcars), in preventing transmission of shock sounds upon changing-over of the ranges and confined sounds inside the car room.

The embodiments of the invention in which an exclusive property or privilege is claimed are defined as follows:

1. A flexible shaft coupling, comprising:
   drive side connecting elements and driven side connecting elements arranged alternately and equidistantly in an annular orientation, said drive side connecting elements and said driven side connecting elements each being formed concentrically of an inner sleeve, an outer sleeve and an elastic intermediate member interposed therebetween;
   plural coupling pieces in an annular form linking together pairs of mutually adjacent drive side connecting elements and driven side connecting elements, said plural coupling pieces each being formed of a belt strip wrapping around a pair of adjacent drive side connecting elements and driven side connecting elements and an elastomeric body surrounding and covering said belt strip;
   said elastic intermediate member being formed as a cylindrically annular rubber bushing having a trapezoidal shape in cross section, said bushing being connected between said inner sleeve and said outer sleeve in a compressed state and extends only in an axially middle portion of the inner and outer sleeves leaving space between it and the axial ends of said inner and outer sleeves; and
   an intermediate sleeve for limiting the approaching distance between each inner sleeve and each outer sleeve, said elastic intermediate member being compressed, during operation, to a range of 25%–50% between said inner sleeve and said outer sleeve, said intermediate sleeve being fitted to one of said inner sleeve and said outer sleeve and extending axially adjacent to said elastic intermediate member on opposite axial sides thereof in said space thereat, said intermediate sleeve being spaced from said elastic intermediate member so as to not obstruct the expansion of said elastic intermediate member during operation.

2. A flexible shaft coupling as claimed in claim 1, wherein said intermediate sleeve has such a thickness that when the elastic intermediate member is subjected to 25–40% of compression strain, the intermediate sleeve is tightly held between the inner and outer sleeves.

3. A flexible shaft coupling as claimed in claim 1, wherein said coupling pieces are one of formed integrally with one another and linked together in a circular orientation, with their portions where the connecting elements are located arranged in a superposing manner.

4. A flexible shaft coupling as claimed in claim 1, wherein an axial length of said elastic intermediate member is tapered from an inner sleeve side to an outer sleeve side, an axial length of said elastic intermediate member at said inner sleeve being greater than an axial length of said elastic intermediate member at said outer sleeve.

* * * * *